United States Patent
Kawano et al.

(10) Patent No.: US 9,683,762 B2
(45) Date of Patent: Jun. 20, 2017

(54) HEAT EXCHANGING DEVICE AND HEAT PUMP

(71) Applicant: Panasonic Intellectual Property Management Co., Ltd., Osaka-shi, Osaka (JP)

(72) Inventors: Bunki Kawano, Osaka (JP); Tomoichiro Tamura, Osaka (JP); Takahiro Matsuura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 226 days.

(21) Appl. No.: 14/434,325

(22) PCT Filed: Oct. 8, 2013

(86) PCT No.: PCT/JP2013/005983
§ 371 (c)(1),
(2) Date: Apr. 8, 2015

(87) PCT Pub. No.: WO2014/057656
PCT Pub. Date: Apr. 17, 2014

(65) Prior Publication Data
US 2015/0260435 A1    Sep. 17, 2015

(30) Foreign Application Priority Data

Oct. 10, 2012 (JP) ................................ 2012-224903
Jan. 10, 2013 (JP) ................................ 2013-002409

(51) Int. Cl.
*F25B 30/02* (2006.01)
*C09K 5/04* (2006.01)
(Continued)

(52) U.S. Cl.
CPC .............. *F25B 30/02* (2013.01); *C09K 5/041* (2013.01); *F25B 1/06* (2013.01); *F25B 41/00* (2013.01);
(Continued)

(58) Field of Classification Search
CPC .......... F25B 30/02; F25B 1/06; F25B 41/003; F25B 41/00; F25B 2341/0014; F25B 1/10;
(Continued)

(56) References Cited

U.S. PATENT DOCUMENTS 3,277,660 A * 10/1966 Kemper .................... F25B 1/06
                                                            62/116
3,701,264 A    10/1972 Newton
(Continued)

FOREIGN PATENT DOCUMENTS

JP    2000-002474    1/2000
JP    2001-165514    6/2001
(Continued)

*Primary Examiner* — Mohammad M Ali
(74) *Attorney, Agent, or Firm* — Hamre, Schumann, Mueller & Larson, P.C.

(57) ABSTRACT

A heat exchange apparatus (300) includes a first heat exchanger (14), an ejector (11), a first extractor (12), a first pump (13), and a liquid path (15). The ejector (11) produces a merged refrigerant flow using a refrigerant vapor and a refrigerant liquid flowing from the first heat exchanger (14). The first extractor (12) receives the merged refrigerant flow from the ejector (11), and extracts the refrigerant liquid from the merged refrigerant flow. The first pump (13) is provided in the liquid path (15). The refrigerant liquid is pumped by the first pump (13) from the first extractor (12) to the ejector (11).

9 Claims, 13 Drawing Sheets

(51) Int. Cl.
  *F25B 1/06* (2006.01)
  *F25B 41/00* (2006.01)
(52) U.S. Cl.
  CPC .... *F25B 41/003* (2013.01); *F25B 2341/0014* (2013.01)
(58) Field of Classification Search
  CPC .......... F25B 49/02; F25B 40/00; F25B 41/04; F25B 47/02; F25B 25/005; F25B 2400/0401; F25B 2600/2501; F25B 2339/047; F25B 2400/04; F25B 1/08; F25B 31/00; F25B 43/006; F25B 45/00; F25B 2400/16; F25B 2341/001; F25B 43/00; C09K 5/041; C09K 5/04
  See application file for complete search history.

(56) References Cited

U.S. PATENT DOCUMENTS

| | | | | |
|---|---|---|---|---|
| 4,523,437 | A * | 6/1985 | Briley | F24D 11/0221 62/238.4 |
| 5,343,711 | A * | 9/1994 | Kornhauser | F25B 1/06 417/198 |
| 6,244,827 | B1 * | 6/2001 | Popov | F04F 5/54 417/313 |
| 6,397,621 | B1 | 6/2002 | Reynaud et al. | |
| 6,672,099 | B1 * | 1/2004 | Yoshimi | F25B 19/00 62/315 |
| 6,675,609 | B2 * | 1/2004 | Takeuchi | F25B 1/08 62/197 |
| 8,051,669 | B2 | 11/2011 | Imai et al. | |
| 2005/0193758 | A1 * | 9/2005 | Wells | F25B 15/02 62/324.2 |

FOREIGN PATENT DOCUMENTS

| | | |
|---|---|---|
| JP | 2006-038333 | 2/2006 |
| JP | 2006-038365 | 2/2006 |
| JP | 2006-097989 | 4/2006 |
| JP | 2006-258390 | 9/2006 |
| JP | 2008-122012 | 5/2008 |
| JP | 2009-115387 | 5/2009 |
| JP | 2010-230267 | 10/2010 |
| WO | 2008/114528 | 9/2008 |
| WO | 2011/006251 | 1/2011 |

* cited by examiner

HEAT EXCHANGING DEVICE AND HEAT PUMP

TECHNICAL FIELD

The present invention relates to heat exchange apparatuses and heat pump apparatuses.

BACKGROUND ART

Typical examples of heat pump apparatuses are refrigeration cycle apparatuses used in appliances such as air conditioners, refrigerator-freezers, and water heaters. In conventional refrigeration cycle apparatuses, chlorofluorocarbon or alternative fluorocarbon is used as a refrigerant. However, such refrigerants are responsible for environmental problems such as destruction of the ozone layer and global warming. Patent Literature 1 discloses a refrigeration cycle apparatus using water as a refrigerant that places very little load on the global environment. The refrigeration cycle apparatus disclosed in Patent Literature 1 is shown in FIG. 12.

The refrigeration cycle apparatus 100 includes an evaporator 110, a condenser 120, a first circulation path 150, and a second circulation path 160. The upper portion of the evaporator 110 is connected to the upper portion of the condenser 120 by a first communication path 130. Compressors 131 and 132 are provided in the first communication path 130. The lower portion of the evaporator 110 is connected to the lower portion of the condenser 120 by a second communication path 140.

It has also been desired to increase the efficiency of refrigeration cycle apparatuses for the purpose of reducing the load on the global environment. Patent Literature 2 discloses a refrigeration cycle apparatus using an ejector as a means for recovering expansion energy of the refrigerant.

CITATION LIST

Patent Literature

Patent Literature 1: JP 2008-122012 A
Patent Literature 2: U.S. Pat. No. 3,701,264 A

SUMMARY OF INVENTION

Technical Problem

However, heat exchange apparatuses or heat pump apparatuses using a refrigerant such as water whose saturated vapor pressure at ordinary temperature (20° C.±15° C.: Japanese Industrial Standards (JIS) Z 8703) is a negative pressure have been required to have a further improved performance. In order to improve the performance of heat exchange apparatuses or heat pump apparatuses, a technique for efficiently increasing the pressure of the refrigerant is essential.

An object of the present invention is to provide a technique for efficiently increasing the pressure of a refrigerant.

Solution to Problem

That is, the present disclosure provides a heat exchange apparatus including:

a first heat exchanger thorough which a refrigerant liquid flows;

an ejector that produces a merged refrigerant flow using a refrigerant vapor externally supplied and the refrigerant liquid flowing from the first heat exchanger;

a first extractor that receives the merged refrigerant flow from the ejector and extracts the refrigerant liquid from the merged refrigerant flow;

a liquid path leading from the first extractor to the ejector via the first heat exchanger; and a first pump that is provided in the liquid path and pumps the refrigerant liquid from the first extractor to the ejector.

Advantageous Effects of Invention

With the above-described technique, the pressure of the refrigerant can be efficiently increased.

DESCRIPTION OF EMBODIMENTS

Figure 12:
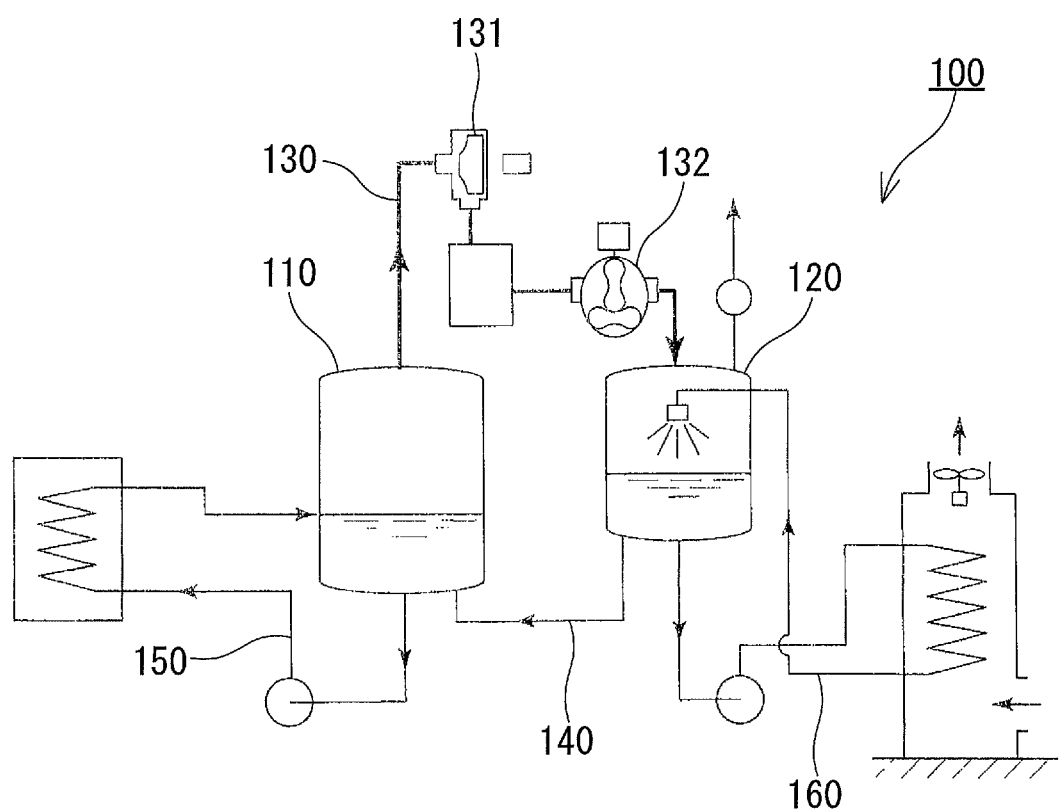
FIG. 12 is a configuration diagram of the conventional refrigeration cycle apparatus.

In order to allow the refrigeration cycle apparatus 100 shown in FIG. 12 to exhibit its performance sufficiently in an application such as space cooling, it is necessary to produce a refrigerant liquid having a temperature that is sufficiently higher than the outside air temperature. The temperature of the refrigerant liquid produced in the condenser 120 depends on the pressure of a refrigerant vapor fed to the condenser 120. Specifically, the pressure of the refrigerant vapor to be fed to the condenser 120 needs to be higher than the saturation pressure of the high-temperature refrigerant liquid. In the refrigeration cycle apparatus 100, the condenser 120 is only a mere condenser and does not have the function of increasing the pressure of the refrigerant. Therefore, in order to produce a high-temperature refrigerant liquid, a vapor source capable of producing a high-pressure refrigerant vapor needs to be arranged at the preceding stage of the condenser 120. If the pressure of the refrigerant vapor is low, a high-temperature refrigerant liquid cannot be produced, and the conditions under which the refrigeration cycle apparatus 100 can be operated are restricted.

The present inventors have studied techniques for producing a high-temperature refrigerant liquid from a low-pressure refrigerant vapor in order to expand the operating range of refrigeration cycle apparatuses (heat pump apparatuses) and to further improve their performance. As a result, the present inventors have arrived at the technique disclosed in the present description.

A first aspect of the present disclosure provides a heat exchange apparatus including:

a first heat exchanger through which a refrigerant liquid flows;

an ejector that produces a merged refrigerant flow using a refrigerant vapor externally supplied and the refrigerant liquid flowing from the first heat exchanger;

a first extractor that receives the merged refrigerant flow from the ejector and extracts the refrigerant liquid from the merged refrigerant flow;

a liquid path leading from the first extractor to the ejector via the first heat exchanger; and a first pump that is provided in the liquid path and pumps the refrigerant liquid from the first extractor to the ejector.

According to the present aspect, the refrigerant liquid flowing from the first heat exchanger is fed to the ejector. This refrigerant liquid is a refrigerant liquid that has been cooled in the first heat exchanger. The ejector is externally supplied with a refrigerant vapor. The pressure inside the ejector is reduced to a pressure lower than the pressure of the refrigerant vapor as a function of the temperature of the fed refrigerant liquid. Therefore, the refrigerant vapor is continuously drawn into a vapor nozzle of the ejector while being expanded and accelerated. Furthermore, the refrigerant vapor condenses due to: (a) a difference in temperature between the refrigerant vapor and the refrigerant liquid; and (b) an increase in pressure caused by energy transport between the refrigerant vapor and the refrigerant liquid and momentum transport between the refrigerant vapor and the refrigerant liquid. That is, the ejector produces a merged refrigerant flow using the refrigerant vapor and the refrigerant liquid. The ejector can be made to function as a condenser. The merged refrigerant flow produced in the ejector is delivered to the first extractor.

For example, in the case of using a refrigerant whose saturated vapor pressure at ordinary temperature is a negative pressure, the volume of the refrigerant vapor is large, and specifically about 100,000 times the volume of the refrigerant liquid. Depending on the operating condition of the ejector, the refrigerant vapor may enter the liquid path leading from the first extractor to the first heat exchanger. In such a situation, it will be difficult for the pump to pump the refrigerant, and difficult for the heat exchange apparatus to continue its operation.

In the first aspect, however, the merged refrigerant flow is delivered to the first extractor, and the refrigerant liquid is extracted from the merged refrigerant flow in the first extractor. The extracted refrigerant liquid is delivered to the first heat exchanger. Therefore, the inside of the liquid path leading from the first extractor to the ejector via the first heat exchanger can be filled with the refrigerant liquid, and the refrigerant liquid can be continuously transferred from the first extractor to the first heat exchanger by the use of the first pump disposed in the liquid path.

For the above reasons, a high-temperature refrigerant liquid can be produced from a low-pressure refrigerant vapor, and, consequently, the operating range of the heat exchange apparatus is expanded.

A second aspect of the present disclosure provides the heat exchange apparatus as set forth in the first aspect, wherein the first pump is provided between the first extractor and the first heat exchanger in the liquid path.

A third aspect of the present disclosure provides the heat exchange apparatus as set forth in the second aspect, the heat exchange apparatus further including a second pump that is provided between the first heat exchanger and the ejector in the liquid path and that pumps, to the ejector, the refrigerant liquid flowing from the first heat exchanger. According to the present aspect, the pressure of the refrigerant liquid to be delivered to the first heat exchanger can be lowered. Therefore, the pressure resistance of the first heat exchanger can be set low.

A fourth aspect of the present disclosure provides the heat exchange apparatus as set forth in the third aspect, wherein a pump head of the second pump is set higher than a pump head of the first pump. According to the present aspect, the load on the first pump can be reduced.

A fifth aspect of the present disclosure provides the heat exchange apparatus as set forth in the third or fourth aspect, the heat exchange apparatus further including a second extractor that is provided between the first heat exchanger and the second pump in the liquid path and that extracts the refrigerant liquid from the refrigerant flowing from the first heat exchanger so that the refrigerant liquid is selectively fed to the second pump. According to the present aspect, even when the refrigerant turns into a gas-liquid two-phase state in the first heat exchanger, the second pump can draw only the refrigerant liquid, and the refrigerant liquid can be stably fed to the ejector.

A sixth aspect of the present disclosure provides the heat exchange apparatus as set forth in the fifth aspect, wherein the second extractor is a gas-liquid separator that separates the refrigerant liquid and the refrigerant vapor from each other.

A seventh aspect of the present disclosure provides the heat exchange apparatus as set forth in the first aspect, wherein the first pump is provided between the first heat exchanger and the ejector in the liquid path. In the heat exchange apparatus of the seventh aspect, the refrigerant liquid to be drawn into the first pump is cooled in the first heat exchanger, and thus the available net positive suction head (NPSHa) of the first pump is increased. Therefore, the potential head applied to the first pump can be reduced by an amount corresponding to the increase in available suction head caused by the cooling of the refrigerant liquid, and, consequently, the heat exchange apparatus can be reduced in size. This is desirable especially for a heat exchange apparatus using a refrigerant whose saturated vapor pressure at ordinary temperature is a negative pressure.

An eighth aspect of the present disclosure provides the heat exchange apparatus as set forth in any one of the first to seventh aspects, wherein the first extractor is a gas-liquid separator that separates the refrigerant liquid and the refrigerant vapor from each other.

The first extractor and the second extractor need not be those that separate the refrigerant liquid and the refrigerant vapor from each other. The first extractor and the second extractor may be those that can extract the refrigerant liquid without generating the refrigerant vapor.

A ninth aspect of the present disclosure provides the heat exchange apparatus as set forth in any one of the first to eighth aspects, wherein the ejector includes: a first nozzle to which the refrigerant liquid is fed; a second nozzle into which the refrigerant vapor is drawn; a mixing section that mixes the refrigerant liquid coming from the first nozzle and the refrigerant vapor coming from the second nozzle so as to produce the merged refrigerant flow; and a diffuser section that decelerates the merged refrigerant flow so as to restore a static pressure of the merged refrigerant flow. In the ejector having such a structure, the temperature and pressure of the refrigerant are increased.

A tenth aspect of the present disclosure provides the heat exchange apparatus as set forth in any one of the first to ninth aspects, wherein a pressure of the merged refrigerant flow discharged from the ejector is higher than a pressure of the refrigerant vapor drawn into the ejector, and is lower than a pressure of the refrigerant liquid fed to the ejector. According to the present aspect, the pressure of the refrigerant can be efficiently increased.

An eleventh aspect of the present disclosure provides the heat exchange apparatus as set forth in any one of the first to tenth aspects, wherein the refrigerant contains water.

A twelfth aspect of the present disclosure provides a heat pump apparatus including:

a compressor that compresses a refrigerant vapor;

a first heat exchanger through which a refrigerant liquid flows;

an ejector that produces a merged refrigerant flow using the refrigerant vapor compressed by the compressor and the refrigerant liquid flowing from the first heat exchanger;

a first extractor that receives the merged refrigerant flow from the ejector and extracts the refrigerant liquid from the merged refrigerant flow;

a liquid path leading from the first extractor to the ejector via the first heat exchanger;

a first pump that is provided in the liquid path and pumps the refrigerant liquid from the first extractor to the ejector;

an evaporator that retains the refrigerant liquid and evaporates the refrigerant liquid so as to produce the refrigerant vapor to be compressed by the compressor;

a second heat exchanger through which the refrigerant liquid retained in the evaporator or a heat medium for heating the refrigerant liquid retained in the evaporator flows;

a circulation path in which the refrigerant liquid or the heat medium circulates via the second heat exchanger; and another pump that is provided in the circulation path and pumps the refrigerant liquid from the evaporator to the second heat exchanger.

In order to allow a heat pump apparatus using a refrigerant whose saturated vapor pressure at ordinary temperature is a negative pressure to exert its performance sufficiently, it is necessary to produce a refrigerant liquid having a temperature that is sufficiently higher than the outside air temperature. In the refrigeration cycle apparatus 100 shown in FIG. 12, the pressure of the refrigerant vapor to be fed to the condenser 120 is increased by the compressors 131 and 132 to a pressure higher than the saturation pressure of the high-temperature refrigerant liquid. However, when the compressors 131 and 132 (specifically, a centrifugal compressor 131 and a positive displacement compressor 132) are used as in the refrigeration cycle apparatus 100, the refrigeration cycle apparatus 100 are likely to increase in size as a whole. Particularly, in the case of using a refrigerant whose saturated vapor pressure at ordinary temperature is a negative pressure, the proportion of the space occupied by the centrifugal compressor 131 and the positive displacement compressor 132 is likely to be large in the refrigeration cycle apparatus 100 since the volumetric flow rate of the refrigerant is very large.

According to the present aspect, the refrigerant liquid fed to the ejector is used as a driving flow, and the refrigerant vapor coming from the compressor is drawn into the ejector. The ejector produces the merged refrigerant flow using the refrigerant liquid and the refrigerant vapor. Since the amount of work to be performed by the compressor can be reduced, the pressure ratio in the compressor can be significantly lowered, and, at the same time, the heat pump apparatus can achieve efficiency comparable to or higher than that of conventional apparatuses. In addition, the heat pump apparatus can be reduced in size.

A thirteenth aspect of the present disclosure provides the heat pump apparatus as set forth in the twelfth aspect, wherein the first pump is provided between the first extractor and the first heat exchanger in the liquid path.

A fourteenth aspect of the present disclosure provides the heat pump apparatus as set forth in the thirteenth aspect, the heat pump apparatus further including a second pump that is provided between the first heat exchanger and the ejector in the liquid path and that pumps, to the ejector, the refrigerant liquid flowing from the first heat exchanger. According to the present aspect, the pressure of the refrigerant liquid to be delivered to the first heat exchanger can be lowered. Therefore, the pressure resistance of the first heat exchanger can be set low.

A fifteenth aspect of the present disclosure provides the heat pump apparatus as set forth in the fourteenth aspect, wherein a pressure at an outlet of the first pump is lower than a pressure at an outlet of the second pump. According to the present aspect, the pressure of the refrigerant liquid to be delivered to the first heat exchanger can be lowered. Therefore, the pressure resistance of the first heat exchanger can be set low.

A sixteenth aspect of the present disclosure provides the heat pump apparatus as set forth in the fourteenth or fifteenth aspect, the heat pump apparatus further including a second extractor that is provided between the first heat exchanger and the second pump in the liquid path and that extracts the refrigerant liquid from the refrigerant flowing from the first heat exchanger so that the refrigerant liquid is selectively fed to the second pump. According to the present aspect, even when the refrigerant turns into a gas-liquid two-phase state in the first heat exchanger, the second pump can draw only the refrigerant liquid, and the refrigerant liquid can be stably fed to the ejector.

A seventeenth aspect of the present disclosure provides the heat pump apparatus as set forth in the twelfth aspect, wherein the first pump is provided between the first heat exchanger and the ejector in the liquid path. According to the present aspect, the same effect as provided by the seventh aspect can be obtained.

An eighteenth aspect of the present disclosure provides the heat pump apparatus as set forth in any one of the twelfth to seventeenth aspects, the ejector includes: a first nozzle to which the refrigerant liquid is fed; a second nozzle into which the refrigerant vapor is drawn; a mixing section that mixes the refrigerant liquid coming from the first nozzle and the refrigerant vapor coming from the second nozzle so as to produce the merged refrigerant flow; and a diffuser section that decelerates the merged refrigerant flow so as to restore a static pressure of the merged refrigerant flow. In the ejector having such a structure, the temperature and pressure of the refrigerant are increased.

A nineteenth aspect of the present disclosure provides the heat pump apparatus as set forth in any one of the twelfth to eighteenth aspects, wherein a pressure of the merged refrigerant flow discharged from the ejector is higher than a pressure of the refrigerant vapor drawn into the ejector, and is lower than a pressure of the refrigerant liquid fed to the ejector. According to the present aspect, the refrigerant liquid fed to the ejector can be used as a driving flow. Consequently, the ejector can be made to function as a condenser by means of a simple configuration. The pressure ratio in the compressor can be significantly lowered, and, at the same time, the heat pump apparatus can achieve efficiency comparable to or higher than that of conventional apparatuses.

Hereinafter, embodiments of the present invention will be described with reference to the drawings. The embodiments given below are not intended to limit the present invention.

Figure 1A:
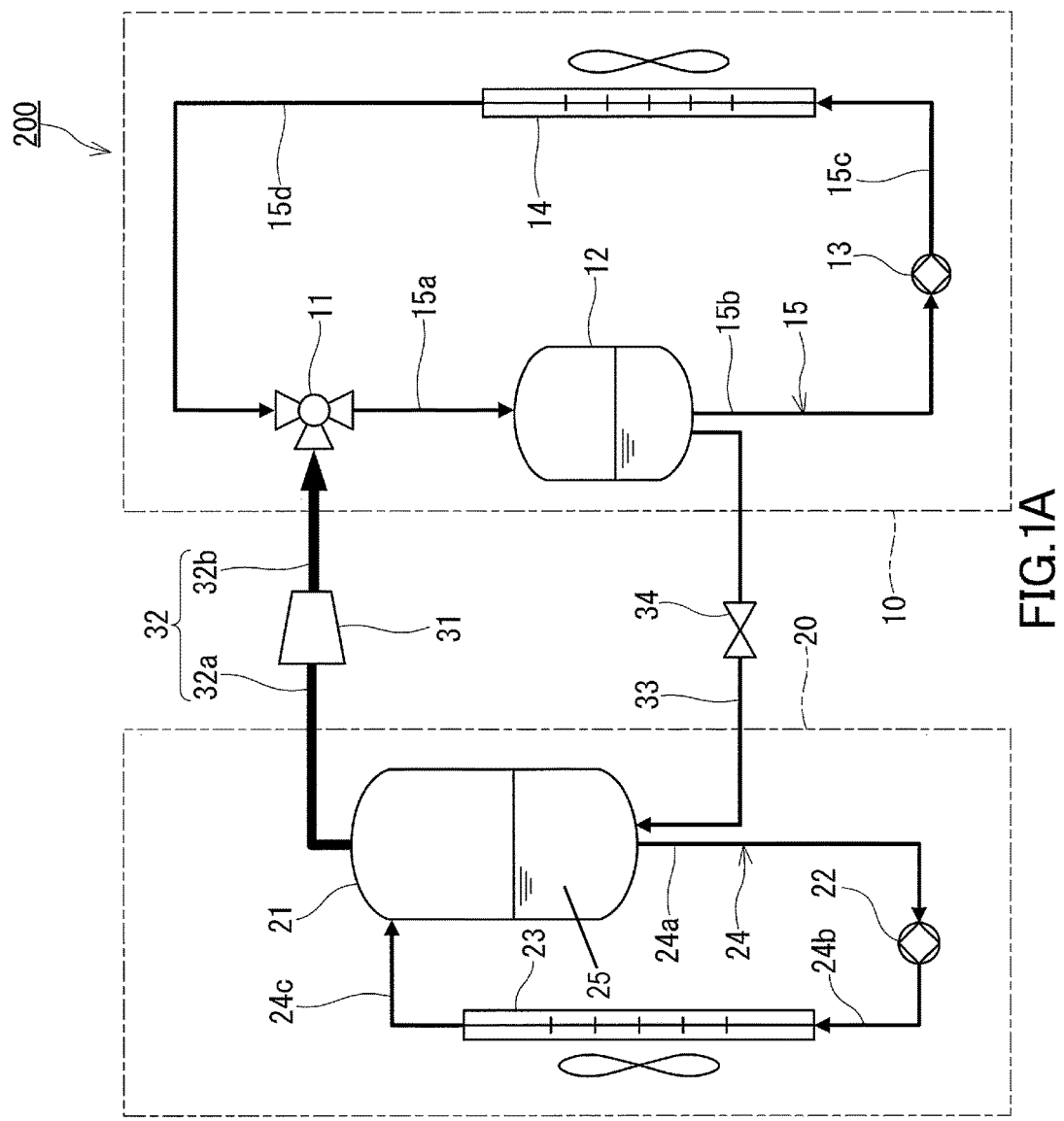
FIGS. 1A and 1B are configuration diagrams of a heat pump apparatus according to an embodiment of the present invention.
Figure 1B:
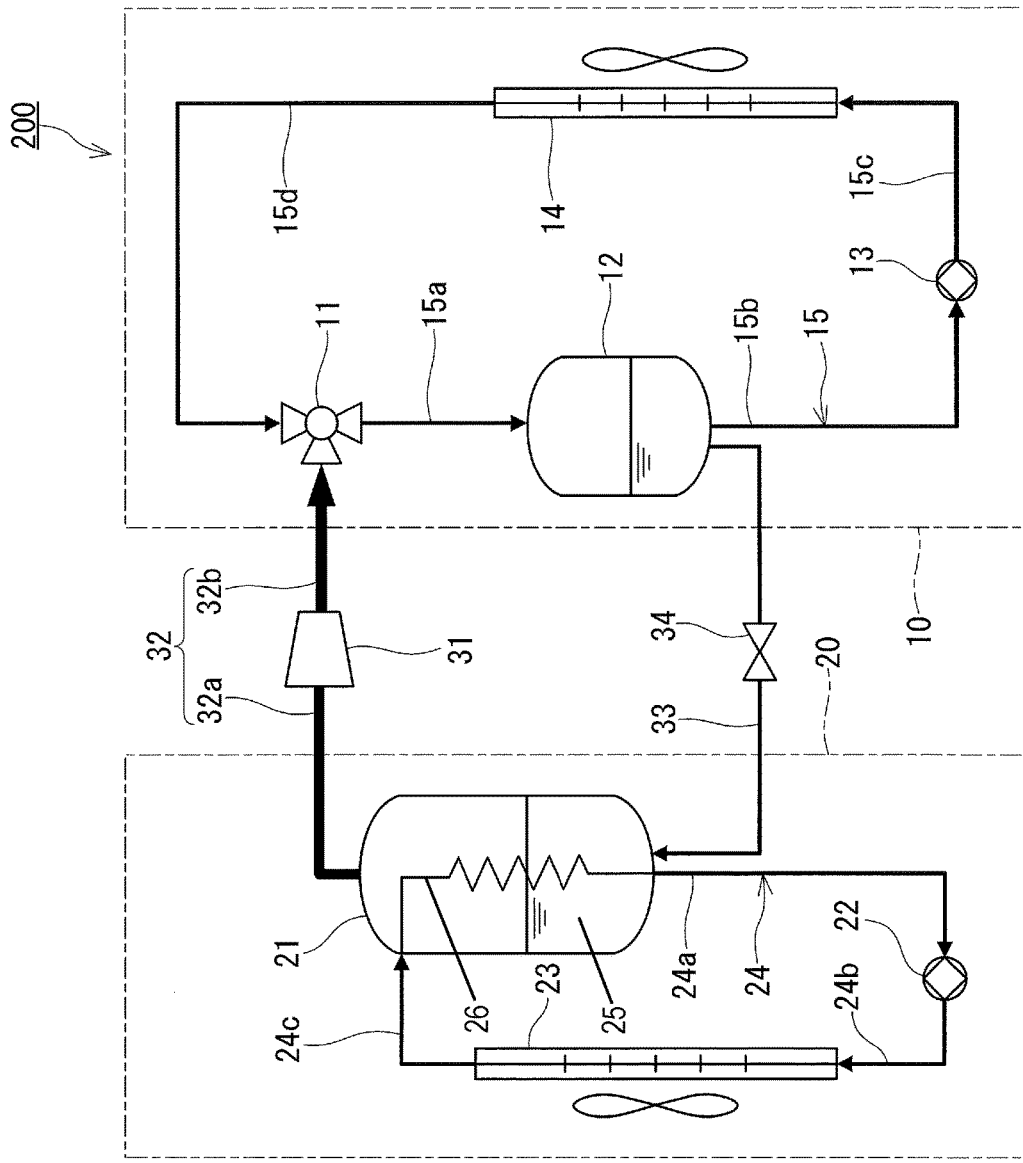

As shown in FIGS. 1A and 1B, a heat pump apparatus (refrigeration cycle apparatus) 200 of the present embodiment includes a first heat exchange unit 10, a second heat exchange unit 20, a compressor 31, and a vapor path 32. The first heat exchange unit 10 and the second heat exchange unit 20 form a heat release-side circuit and a heat absorption-side circuit, respectively. A refrigerant vapor produced in the second heat exchange unit 20 is fed to the first heat exchange unit 10 via the compressor 31 and the vapor path 32.

The heat pump apparatus 200 is loaded with a refrigerant whose saturated vapor pressure at ordinary temperature is a negative pressure (a pressure that is lower than atmospheric pressure in terms of absolute pressure). An example of such a refrigerant is a refrigerant containing water, an alcohol, or an ether as a main component. While the heat pump apparatus 200 is in operation, the pressure inside the heat pump apparatus 200 is lower than atmospheric pressure. The pressure at the inlet of the compressor 31 is, for example, in the range of 0.5 to 5 kPaA. The pressure at the outlet of the compressor 31 is, for example, in the range of 5 to 15 kPaA. For the purpose of antifreezing or the like, a refrigerant can also be used which contains water as a main component and further contains ethylene glycol, Naiburain, or an inorganic salt in an amount of 10 to 40% by mass. The "main component" means a component whose content is the highest in terms of mass ratio.

The first heat exchange unit 10 includes an ejector 11, a first extractor 12, a first pump 13, and a first heat exchanger 14. The ejector 11, the first extractor 12, the first pump 13, and the first heat exchanger 14 are connected in a circuit in this order by pipes 15a to 15d.

Figure 2:
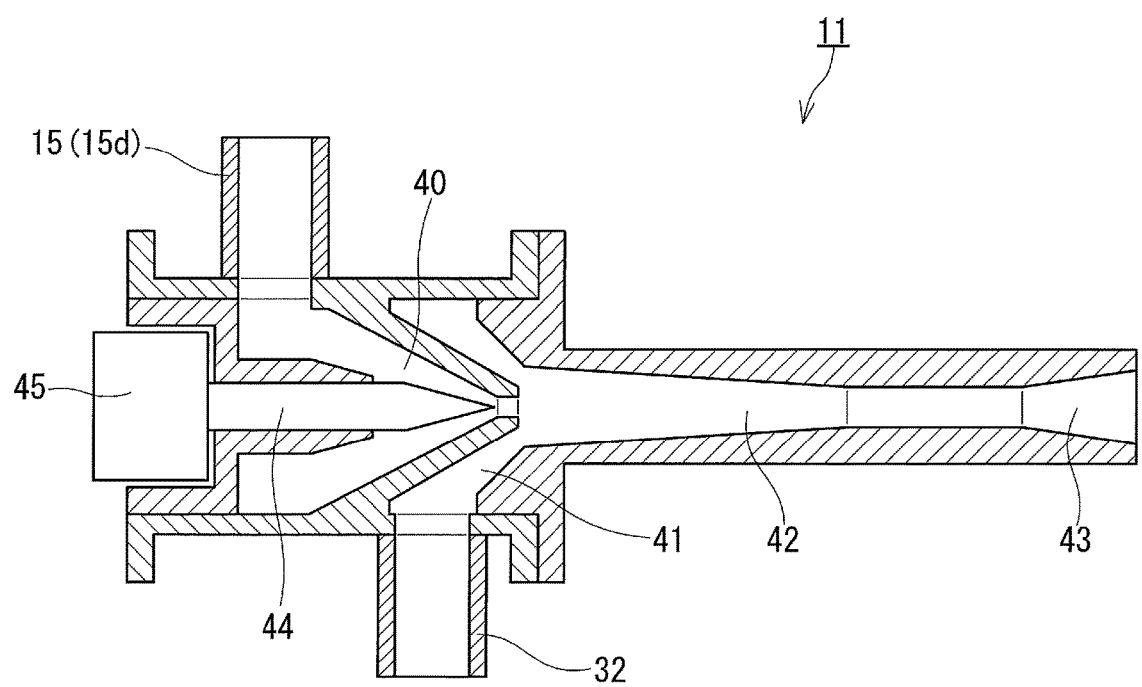
FIG. 2 is a cross-sectional view of an ejector.

As shown in FIG. 2, the ejector 11 has a first nozzle 40, a second nozzle 41, a mixing section 42, and a diffuser section 43. The first nozzle 40 is connected to the first heat exchanger 14 by the pipe 15d. The refrigerant liquid flowing from the first heat exchanger 14 is fed as a driving flow to the first nozzle 40 through the pipe 15d. The vapor path 32 is connected to the second nozzle 41. The temperature of the refrigerant liquid to be injected from the first nozzle 40 is lowered by the first heat exchanger 14. Therefore, as a result of the injection of the refrigerant liquid from the first nozzle 40, the pressure in the mixing section 42 becomes lower than the pressure in the vapor path 32. Consequently, the refrigerant vapor having a pressure equal to or lower than atmospheric pressure is continuously drawn into the second nozzle 41 through the vapor path 32. The refrigerant liquid injected from the first nozzle 40 while being accelerated, and the refrigerant vapor injected from the second nozzle 41 while being expanded and accelerated, are mixed together in the mixing section 42. Then, there occur first condensation caused by the difference in temperature between the refrigerant liquid and the refrigerant vapor and second condensation caused by the effect of pressure increase due to both energy transport between the refrigerant liquid and the refrigerant vapor and momentum transport between the refrigerant liquid and the refrigerant vapor. As a result, a merged refrigerant flow with a low quality (degree of dryness) is produced. When the quality of this merged refrigerant flow is not zero, the flow velocity of the merged refrigerant flow exceeds the sound velocity in two-phase flow, which leads to a drastic pressure increase and thus promotes the condensation. The merged refrigerant flow produced is a flow of the refrigerant that is in a liquid state or that is in a two-phase state having a very low quality. Subsequently, the diffuser section 43 decelerates the merged refrigerant flow so as to restore a static pressure of the merged refrigerant flow. In the ejector 11 having the structure as thus far described, the temperature and pressure of the refrigerant are increased.

The ejector 11 further includes a needle valve 44 and a servo actuator 45. The needle valve 44 and the servo actuator 45 are flow rate regulators for regulating the flow rate of the refrigerant liquid serving as a driving flow. The cross-sectional area of the orifice at the end of the first nozzle 40 can be varied by the needle valve 44. The position of the needle valve 44 is adjusted by the servo actuator 45. Thus, the flow rate of the refrigerant liquid flowing in the first nozzle 40 can be regulated.

The first extractor 12 receives the merged refrigerant flow from the ejector 11, and extracts the refrigerant liquid from the merged refrigerant flow. That is, the first extractor 12 serves as a gas-liquid separator that separates the refrigerant liquid and the refrigerant vapor from each other. Basically, only the refrigerant liquid is drawn out of the first extractor 12. The first extractor 12 is formed, for example, by a pressure-resistant container having thermal insulation properties. It is then possible to prevent the decrease in temperature and pressure on the outlet side of the ejector 11, and therefore it is easy for the merged refrigerant flow to increase its temperature and pressure in the ejector 11. The first extractor 12 is desirably configured to maintain both the temperature and pressure of the merged refrigerant flow which have been increased in the ejector 11. The structure of the first extractor 12 is not particularly limited. The pipes 15b to 15d form a liquid path 15 leading from the first extractor 12 to the ejector 11 via the first heat exchanger 14. The first pump 13 is provided between the liquid outlet of the first extractor 12 and the inlet of the first heat exchanger 14 in the liquid path 15. The refrigerant liquid retained in the first extractor 12 is pumped by the first pump 13 to the first heat exchanger 14. The discharge pressure of the first pump 13 is lower than atmospheric pressure. The first pump 13 is located at such a position that the height from the suction port of the first pump 13 to the level of the refrigerant liquid in the first extractor 12 is greater than the required net positive suction head (required NPSH).

The first heat exchanger 14 is formed by a commonly-known heat exchanger such as a fin tube heat exchanger and a shell tube heat exchanger. When the heat pump apparatus 200 is an air conditioner that performs indoor cooling, the first heat exchanger 14 is placed outdoors, and heats the outdoor air by means of the refrigerant liquid.

The second heat exchange unit 20 has an evaporator 21, a pump 22 (third pump), and a second heat exchanger 23. The evaporator 21 retains the refrigerant liquid, and evaporates the refrigerant liquid so as to produce the refrigerant vapor to be compressed by the compressor 31. The evaporator 21, the pump 22, and the second heat exchanger 23 are connected in a circuit by pipes 24a to 24c. The evaporator 21 is formed, for example, by a pressure-resistant container having thermal insulation properties. The pipes 24a to 24c form a circulation path 24 in which the refrigerant liquid retained in the evaporator 21 circulates via the second heat exchanger 23. The pump 22 is provided between the liquid outlet of the evaporator 21 and the inlet of the second heat exchanger 23 in the circulation path 24. The refrigerant liquid retained in the evaporator 21 is pumped by the pump 22 to the second heat exchanger 23. The discharge pressure of the pump 22 is lower than atmospheric pressure. The pump 22 is located at such a position that the height from the suction port of the pump 22 to the level of the refrigerant liquid in the evaporator 21 is greater than the required net positive suction head (required NPSH).

The second heat exchanger 23 is formed by a commonly-known heat exchanger such as a fin tube heat exchanger or a shell tube heat exchanger. When the heat pump apparatus 200 is an air conditioner that performs indoor cooling, the second heat exchanger 23 is placed indoors, and cools the indoor air by means of the refrigerant liquid.

In the present embodiment, the evaporator 21 is a heat exchanger inside which the refrigerant liquid heated through the circulation in the circulation path 24 is directly evaporated. The refrigerant liquid 25 retained in the evaporator 21 comes into direct contact with the refrigerant liquid circulating in the circulation path 24. That is, a part of the refrigerant liquid in the evaporator 21 is heated by the second heat exchanger 23, and used as a heat source for heating the saturated refrigerant liquid. The upstream end of the pipe 24a is desirably connected to the lower portion of the evaporator 21. The downstream end of the pipe 24c is desirably connected to the middle portion of the evaporator 21. The second heat exchange unit 20 may be configured so that the refrigerant liquid 25 retained in the evaporator 21 is prevented from being mixed with the other refrigerant liquid that is circulating in the circulation path 24. For example, as shown in FIG. 1B, when the evaporator 21 has a heat exchange structure like that of a shell tube heat exchanger, the refrigerant liquid 25 retained in the evaporator 21 can be heated and evaporated by a heat medium in the tube 26 circulating in the circulation path 24. The heat medium in the tube 26 for heating the refrigerant liquid 25 retained in the evaporator 21 flows through the second heat exchanger 23.

The vapor path 32 has an upstream portion 32a and a downstream portion 32b. The compressor 31 is disposed in the vapor path 32. The upper portion of the evaporator 21 is connected to the suction port of the compressor 31 by the upstream portion 32a of the vapor path 32. The discharge port of the compressor 31 is connected to the second nozzle 41 of the ejector 11 by the downstream portion 32b of the vapor path 32. The compressor 31 is a centrifugal compressor or a positive displacement compressor. A plurality of compressors may be provided in the vapor path 32. The compressor 31 draws the refrigerant vapor from the evaporator 21 of the second heat exchange unit 20 through the upstream portion 32a, and compresses the refrigerant vapor. The compressed refrigerant vapor is fed to the ejector 11 through the downstream portion 32b.

According to the present embodiment, the temperature and pressure of the refrigerant are increased in the ejector 11. Since the amount of work to be performed by the compressor 31 can be reduced, the pressure ratio in the compressor 31 can be significantly lowered, and, at the same time, the heat pump apparatus 200 can achieve efficiency comparable to or higher than that of conventional apparatuses. In addition, the heat pump apparatus 200 can be reduced in size.

The heat pump apparatus 200 is not limited to an air conditioner designed only for space cooling. A flow path switching part, such as a four-way valve and a three-way valve, may be provided so that the first heat exchanger 14 functions as a heat exchanger for heat absorption and the second heat exchanger 23 functions as a heat exchanger for heat release. With this configuration, an air conditioner switchable between space cooling operation and space heating operation is obtained. In addition, the heat pump apparatus 200 is not limited to an air conditioner, and may be another type of apparatus such as a chiller and a heat accumulator. The target to be heated by the first heat exchanger 14 and the target to be cooled by the second heat exchanger 23 may be a gas other than air or a liquid.

Furthermore, a return path 33 for returning the refrigerant from the first heat exchange unit 10 to the second heat exchange unit 20 may be provided. An expansion mechanism 34 such as a capillary and an expansion valve is provided in the return path 33. In the present embodiment, the first extractor 12 and the evaporator 21 are connected together by the return path 33 so as to allow the refrigerant retained in the first extractor 12 to be transferred to the evaporator 21. Typically, the lower portion of the first extractor 12 and the lower portion of the evaporator 21 are connected together by the return path 33. The refrigerant liquid is returned from the first extractor 12 to the evaporator 21 through the return path 33 while being reduced in pressure in the expansion mechanism 34.

The return path 33 may be branched from any point of the first heat exchange unit 10. For example, the return path 33 may be branched from the pipe 15a connecting the ejector 11 to the first extractor 12, or may be branched from the upper portion of the first extractor 12. Furthermore, it is not essential to return the refrigerant from the first heat exchange unit 10 to the second heat exchange unit 20. For example, the first heat exchange unit 10 may be configured to discharge an excess of the refrigerant where appropriate, and the second heat exchange unit 20 may be configured to be replenished with the refrigerant where appropriate.

Next, the operation of the heat pump apparatus 200 will be described.

Figure 3A:
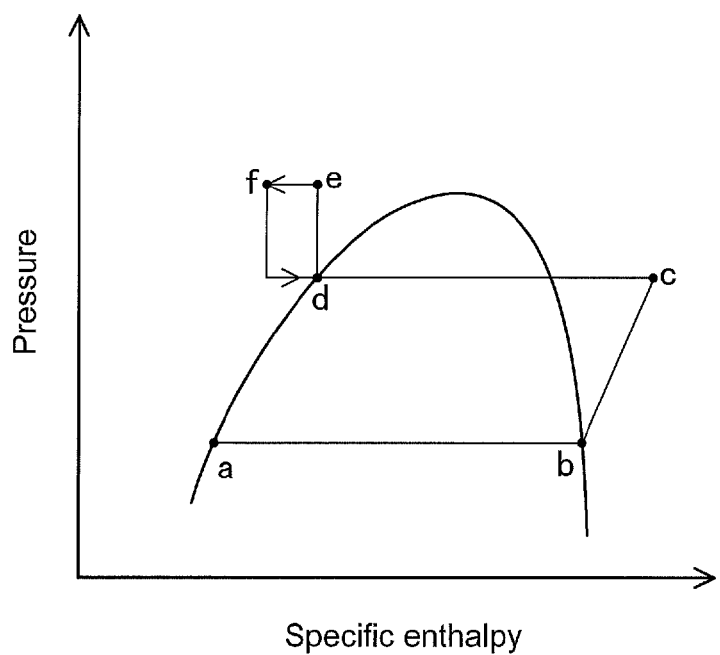
FIG. 3A is a Mollier diagram for a conventional refrigeration cycle apparatus shown in FIG. 12.

FIG. 3A is a Mollier diagram for the conventional refrigeration cycle apparatus 100 (see FIG. 12) having no ejector. The refrigerant liquid retained in the evaporator 110 evaporates inside the evaporator 110 and turns into the refrigerant vapor (point a→point b). The refrigerant vapor is compressed in the compressors 131 and 132 (point b→point c). For simplicity, the intermediate cooler provided between the compressor 131 and the compressor 132 is not discussed. The compressed refrigerant vapor is cooled and condensed in the condenser 120 (point c→point d). The refrigerant liquid retained in the condenser 120 is pumped by a pump to a heat exchanger (point d→point e). The refrigerant liquid is cooled in the heat exchanger (point e→point f). The cooled refrigerant liquid is returned to the condenser 120 (point f→point d). A part of the refrigerant liquid is returned to the evaporator 110 through the second communication path 140 (point d→point a).

Figure 3B:
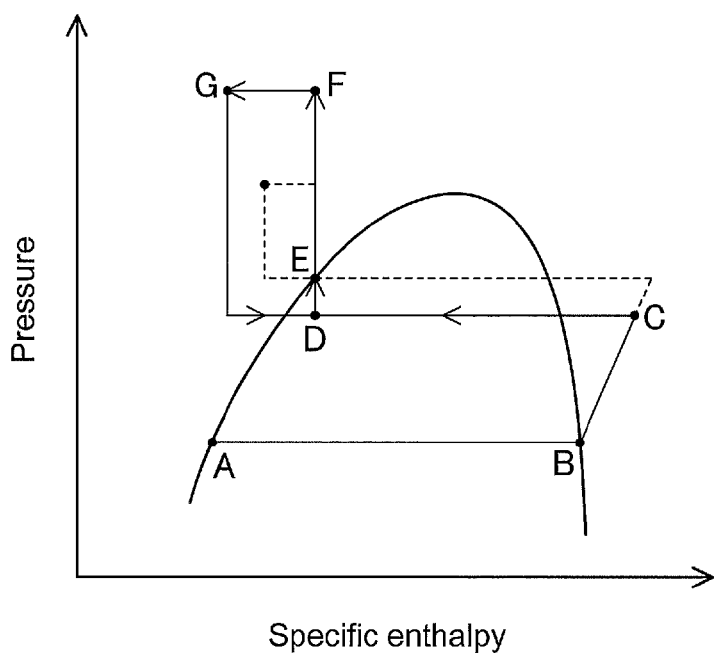
FIG. 3B is a Mollier diagram for the heat pump apparatus of the present embodiment.

FIG. 3B is a Mollier diagram for the heat pump apparatus 200 of the present embodiment. The dashed line represents a part of the cycle described with reference to FIG. 3A. The refrigerant liquid retained in the evaporator 21 evaporates inside the evaporator 21 and turns into the refrigerant vapor (point A→point B). The refrigerant vapor is compressed in the compressor 31 (point B→point C). The compressed refrigerant vapor is drawn into the ejector 11, and mixed with the refrigerant liquid flowing from the first heat exchanger 14 (point C→point D). The merged refrigerant flow containing the refrigerant vapor and the refrigerant liquid is caused to increase in temperature and pressure in the ejector 11 (point D→point E). Specifically, in the ejector 11, the refrigerant vapor condenses while releasing heat. Thus, the temperature of the merged refrigerant flow is also increased. The merged refrigerant flow is a flow of the refrigerant that is in a liquid state or gas-liquid two-phase state. The state of the refrigerant at the outlet of the ejector 11 varies depending on the operating condition of the heat pump apparatus 200. It is ideal that, at the outlet of the ejector 11, the refrigerant be completely in the liquid state, in other words, the quality of the refrigerant be zero. The merged refrigerant flow is delivered from the ejector 11 to the first extractor 12, and is separated into the refrigerant liquid and the refrigerant vapor. The refrigerant liquid retained in the first extractor 12 is pumped by the first pump 13 to the first heat exchanger 14 (point E→point F). The refrigerant liquid is cooled in the first heat exchanger 14 (point F→point G). The first heat exchanger 14 cools the refrigerant liquid, whose pressure has been increased by the first pump 13, to a temperature in the subcooled region. The cooled refrigerant liquid is fed to the ejector 11 as a driving flow (point G→point D). A part of the refrigerant liquid may be returned from the first extractor 12 or the pipe 15a to the evaporator 21 (point E→point A).

As can be understood from the points D, E, and G, the pressure of the merged refrigerant flow discharged from the ejector 11 is higher than the pressure of the refrigerant vapor drawn into the ejector 11, and is lower than the pressure of the refrigerant liquid fed to the ejector 11. In other words, the pressure at the outlet of the ejector 11 is higher than the pressure at the inlet of the second nozzle 41 of the ejector 11, and is lower than the pressure at the inlet of the first nozzle 40 of the ejector 11. Due to such a relationship between the pressures, the pressure of the refrigerant can be efficiently increased. According to the present embodiment, the ejector 11 can be made to function as a condenser.

The pressure at the outlet of the ejector 11 is, for example, in the range of 6 to 1000 kPaA. The pressure at the inlet of the second nozzle 41 of the ejector 11 is, for example, in the range of 5 to 15 kPaA. The pressure at the inlet of the first nozzle 40 of the ejector 11 is, for example, in the range of 300 to 1500 kPaA.

As can be understood by comparison between FIG. 3A and FIG. 3B, the amount of work to be performed by the compressor 31 in the cycle of FIG. 3B is smaller than the amount of work to be performed by the compressors 131 and 132 in the cycle of FIG. 3A. That is, according to the present embodiment, the pressure ratio in the compressor 31 can be reduced. For example, when water is used as the refrigerant, the pressure ratio in the compressor 31 can be reduced by about 30% by feeding the refrigerant liquid having a pressure of several hundred kPa to several MPa as a driving flow to the ejector 11.

It may appear that, in the cycle of FIG. 3B, the amount of heat release in the first heat exchanger 14 is increased. However, there is no large difference in the amount of heat release between the cycle of FIG. 3A and the cycle of FIG. 3B since the amount of the circulating refrigerant liquid is reduced in the cycle of FIG. 3B. In the cycle of FIG. 3B, the amount of work of the first pump 13 is increased. However, considering reduction in the amount of work of the compressor 31, the efficiency (COP: coefficient of performance) of the heat pump apparatus 200 is comparable to or higher than the efficiency of the conventional refrigeration cycle apparatus 100.

In addition, with the heat pump apparatus 200 of the present embodiment, a refrigerant liquid having a higher temperature can be easily produced. That is, the heat pump apparatus 200 can be used for space cooling in a wide variety of regions, ranging from regions with relatively warm climates to regions with very high outside temperatures such as desert regions and tropical regions. Furthermore, the use of the heat pump apparatus 200 for space heating provides the effects described below. In order to prevent demagnetization of the permanent magnet used in the motor of the compressor 31, the temperature of the refrigerant discharged from the compressor 31 should be limited in some cases. According to the present embodiment, however, since a refrigerant liquid having a higher temperature can be produced by the ejector 11, high-temperature space heating can be performed while the temperature of the refrigerant discharged from the compressor 31 is controlled. The heat pump apparatus 200 can also be used for water heating as well as for space heating, and is capable of higher-temperature water heating.

The refrigerant liquid retained in the evaporator 21 is pumped by the pump 22 to the second heat exchanger 23, absorbs heat from a heat medium such as indoor air in the second heat exchanger 23, and then returns to the evaporator 21. The refrigerant liquid in the evaporator 21 evaporates by boiling under reduced pressure, and the refrigerant vapor produced by the evaporation is drawn into the compressor 31.

In the heat pump apparatus 200 of the present embodiment, a refrigerant whose saturated vapor pressure at ordinary temperature is a negative pressure is used. For example, in the case of using a refrigerant containing water as a main component, the volume of the refrigerant vapor is large, and specifically about 100,000 times the volume of the refrigerant liquid. Therefore, if the refrigerant vapor enters the liquid path 15, a very large pump power will be required.

According to the present embodiment, the merged refrigerant flow produced in the ejector 11 is delivered to the first extractor 12, and the refrigerant liquid is extracted from the merged refrigerant flow in the first extractor 12. The first pump 13 is provided between the liquid outlet of the first extractor 12 and the inlet of the first heat exchanger 14 in the liquid path 15. The refrigerant liquid extracted in the first extractor 12 is delivered to the first heat exchanger 14 by the first pump 13. With such a configuration, the inside of the liquid path 15 leading from the first extractor 12 to the ejector 11 via the first heat exchanger 14 can be filled with the refrigerant liquid, and the refrigerant liquid can be continuously pumped by the first pump 13 to the first heat exchanger 14 and the ejector 11. In other words, entry of the refrigerant vapor into the liquid path 15 can be prevented.

(Modification 1)

Figure 4:
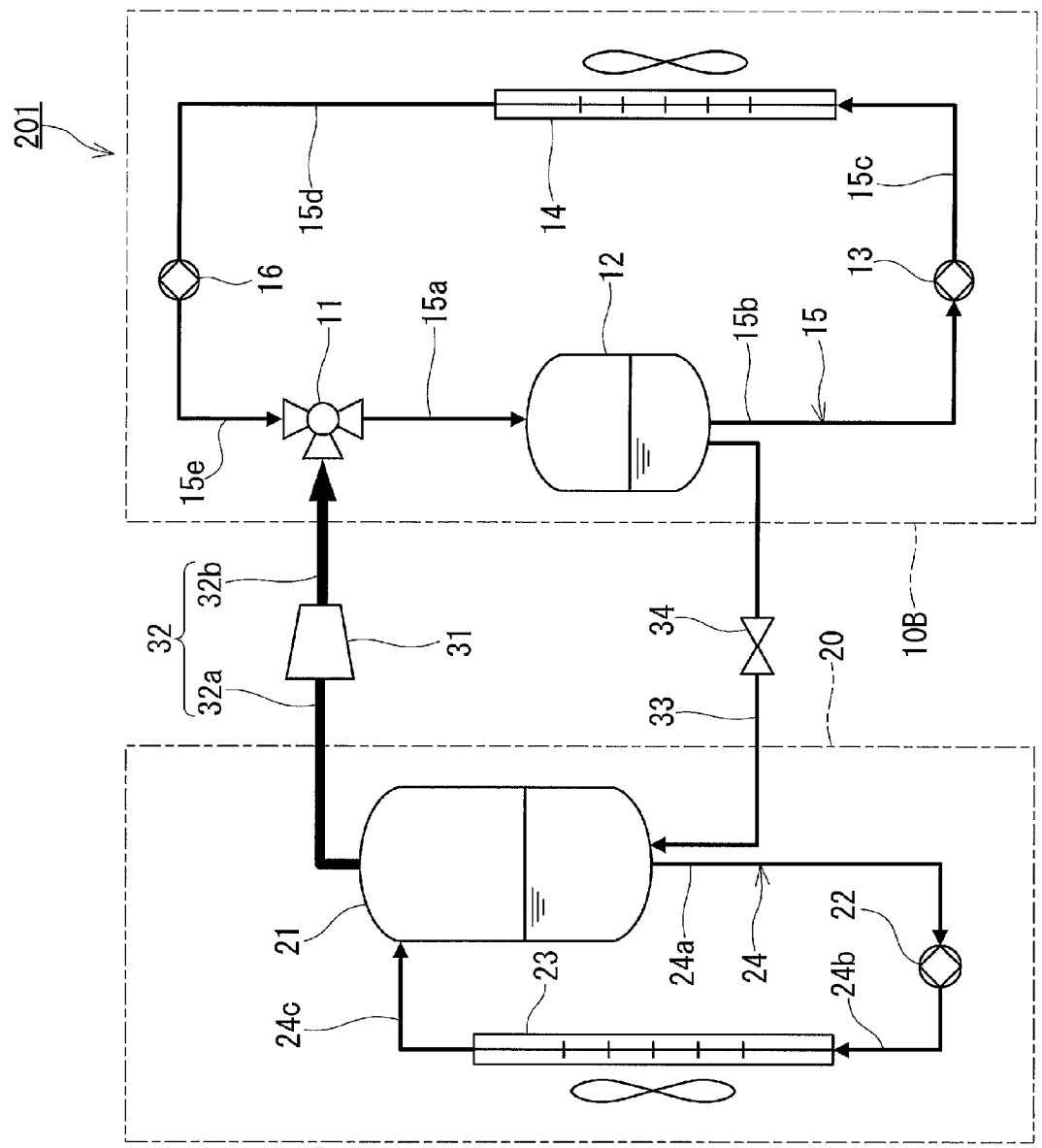
FIG. 4 is a configuration diagram of a heat pump apparatus according to a modification 1.

As shown in FIG. 4, a heat pump apparatus 201 of a modification 1 has a first heat exchange unit 10B having a different configuration from the first heat exchange unit 10 of the heat pump apparatus 200 described with reference to FIG. 1. Specifically, the heat pump apparatus 201 further includes a second pump 16. The other components of the heat pump apparatus 201 are the same as those of the heat pump apparatus 200 described with reference to FIG. 1.

The second pump 16 is provided between the outlet of the first heat exchanger 14 and the ejector 11 in the liquid path 15. The refrigerant liquid flowing from the first heat exchanger 14 is pumped by the second pump 16 to the ejector 11. In the present modification, the liquid path 15 is formed by pipes 15b to 15e. By the function of the second pump 16, the load on the first pump 13 can be reduced.

In the heat pump apparatus 201, the pressure at the outlet of the first pump 13 is lower than the pressure at the outlet of the second pump 16. In addition, the pump head of the second pump 16 is set higher than the pump head of the first pump 13. In other words, the difference between the pressures at the inlet and outlet of the second pump 16 is greater than the difference between the pressures at the inlet and outlet of the first pump 13. With such a relationship existing between the pressures, the pressure of the refrigerant liquid to be delivered to the first heat exchanger 14 can be lowered. Therefore, the pressure resistance of the first heat exchanger 14 can be set low. Furthermore, since the pressure of the refrigerant liquid is increased in several separate stages, the amount of increase in pressure by each of the pumps 13 and 16 is relatively small. Therefore, rotation at high rate and increase in size of the pumps 13 and 16 can be avoided, and, consequently, efficient pumps can be used as the pumps 13 and 16.

(Modification 2)

Figure 5:
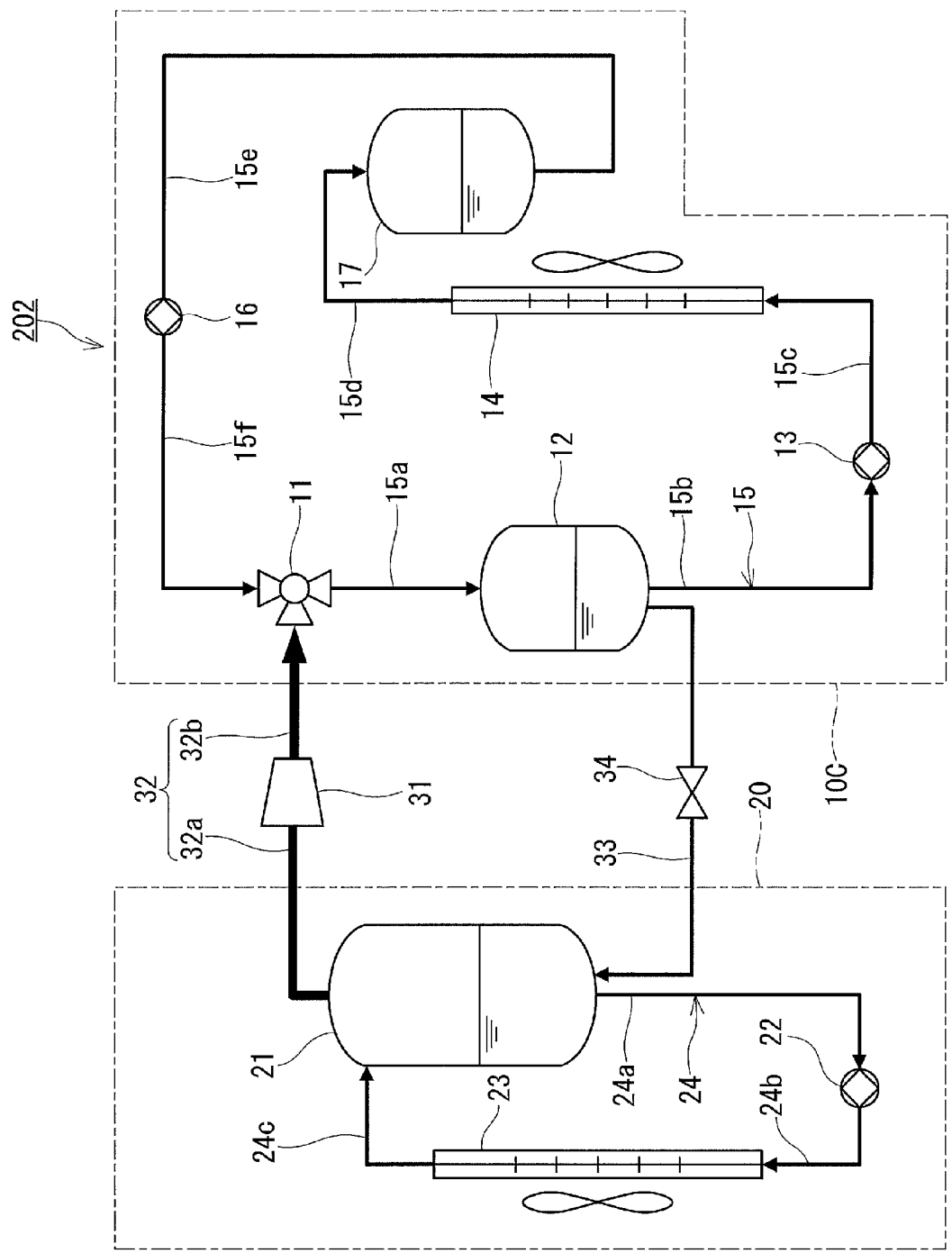
FIG. 5 is a configuration diagram of a heat pump apparatus according to a modification 2.

As shown in FIG. 5, a heat pump apparatus 202 of a modification 2 has a first heat exchange unit 10C having a different configuration from the first heat exchange unit 10 of the heat pump apparatus 200 described with reference to FIG. 1. Specifically, the heat pump apparatus 202 further includes the second pump 16 and a second extractor 17. The other components of the heat pump apparatus 202 are the same as those of the heat pump apparatus 200 described with reference to FIG. 1.

The second pump 16 is identical to that described in the modification 1, and is provided between the liquid outlet of the second extractor 17 and the ejector 11 in the liquid path 15 so as to pump the refrigerant liquid retained in the second extractor 17 to the ejector 11.

The second extractor 17 is provided between the outlet of the first heat exchanger 14 and the inlet of the second pump 16 in the liquid path 15. With the second extractor 17, the refrigerant liquid can be extracted from the refrigerant flowing from the first heat exchanger 14 so that the refrigerant liquid is selectively fed to the second pump 16. That is, the second extractor 17 serves as a gas-liquid separator that separates the refrigerant liquid and the refrigerant vapor from each other. Basically, only the refrigerant liquid is drawn out of the second extractor 17. The second extractor 17 is formed, for example, by a pressure-resistant container having thermal insulation properties. However, the structure of the second extractor 17 is not particularly limited as long as the second extractor 17 can extract the refrigerant liquid. In the present modification, the liquid path 15 is formed by pipes 15b to 15f. With such a configuration, the second pump 16 can draw only the refrigerant liquid and can stably feed the refrigerant liquid to the ejector 11 even when the refrigerant flowing from the first heat exchanger 14 is in a gas-liquid two-phase state. That is, according to the present modification, the heat pump apparatus 202 can be operated more stably.

Furthermore, providing the second extractor 17 in addition to the first extractor 12 produces the effect as described below. While the heat pump apparatus 202 is not in operation, the refrigerant is accumulated generally in the lower half portion of the heat pump apparatus 202 due to gravity. The first heat exchanger 14 has an outlet at its vertically upper portion because of the need for gas venting. Therefore, during the start up of the heat pump apparatus 202, a gas (refrigerant vapor) is discharged from the first heat exchanger 14. If this gas is drawn into the second pump 16, it may become difficult for the second pump 16 to pump the refrigerant. However, with the second extractor 17 being provided, the second extractor 17 functions as a gas-liquid separator, and allows the refrigerant liquid to be selectively fed to the second pump 16 also during the start up of the heat pump apparatus 202. Therefore, the second pump 16 can be started up normally, and, consequently, the heat pump apparatus 202 can be started up stably.

(Modification 3)

Figure 6:
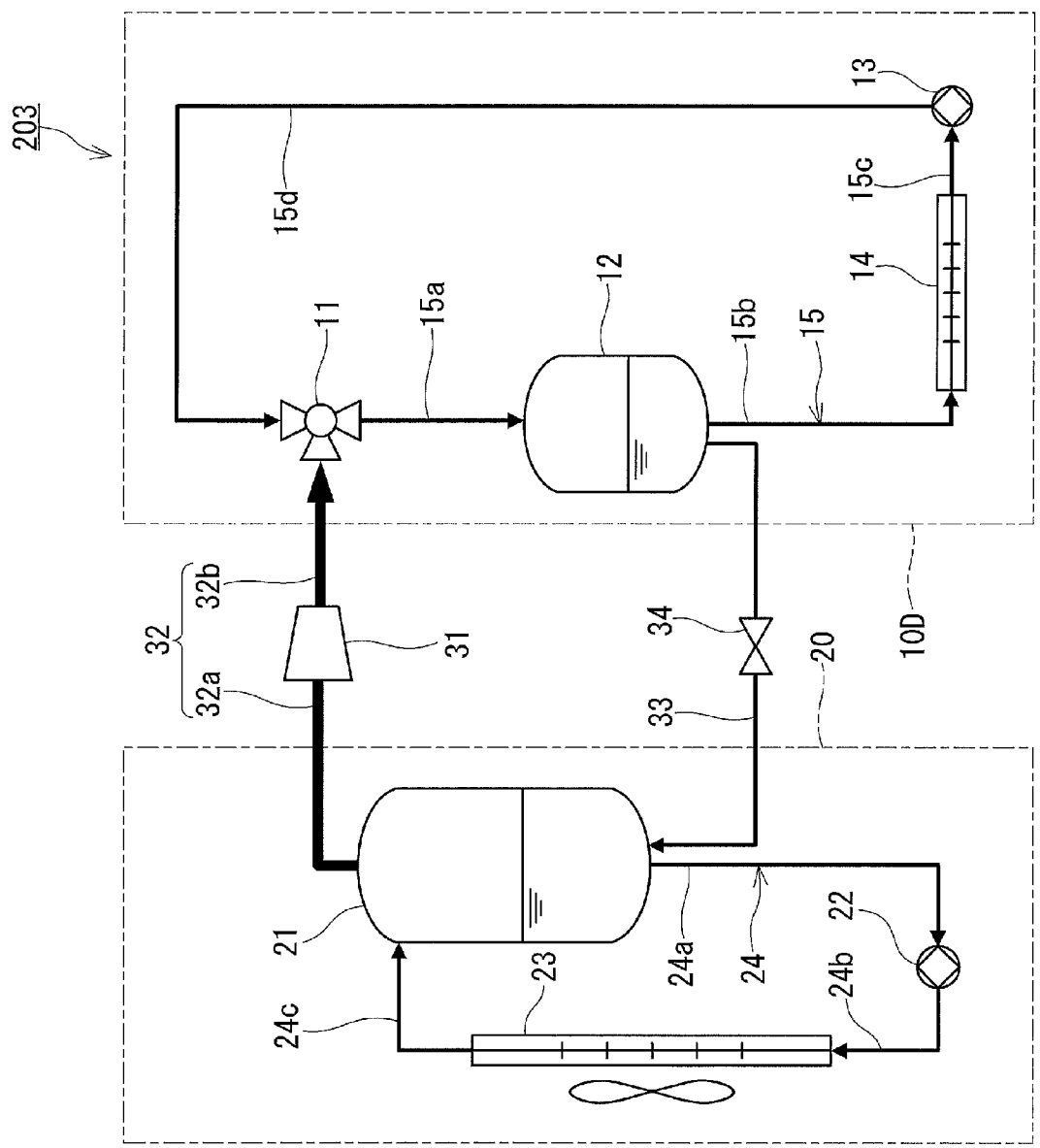
FIG. 6 is a configuration diagram of a heat pump apparatus according to modification 3.

As shown in FIG. 6, a heat pump apparatus 203 of a modification 3 has a first heat exchange unit 10D having a different configuration from the first heat exchange unit 10 of the heat pump apparatus 200 described with reference to FIG. 1. Specifically, in the heat pump apparatus 203, the first pump 13 is provided between the outlet of the first heat exchanger 14 and the inlet of the ejector 11 in the liquid path 15. The first nozzle 40 of the ejector 11 and the first pump 13 are connected by the pipe 15d. The other components of the heat pump apparatus 203 are the same as those of the heat pump apparatus 200 described with reference to FIG. 1.

The refrigerant liquid retained in the first extractor 12 is pumped by the first pump 13 to the ejector 11 via the first heat exchanger 14. The discharge pressure of the first pump 13 is lower than atmospheric pressure. The first pump 13 is located at such a position that both the height from the suction port of the first pump 13 to the level of the refrigerant liquid in the first extractor 12 and an available net positive suction head determined in consideration of the decrease in temperature of the refrigerant liquid in the first heat exchanger 14 are greater than the required net positive suction head (required NPSH). The refrigerant liquid to be drawn into the first pump 13 is cooled in the first heat exchanger 14, so that the available net positive suction head of the first pump 13 is increased. Therefore, the potential head applied to the first pump 13 can be reduced. In this case, the first heat exchange unit 10 can be reduced in size.

The first pump 13 is located, for example, below the bottom surface of the first extractor 12 in the gravity direction. With the first pump 13 being located at such a position, it is possible to prevent the first pump 13 from drawing a gas when the heat pump apparatus 200 is started up again after shutdown.

Figure 7:
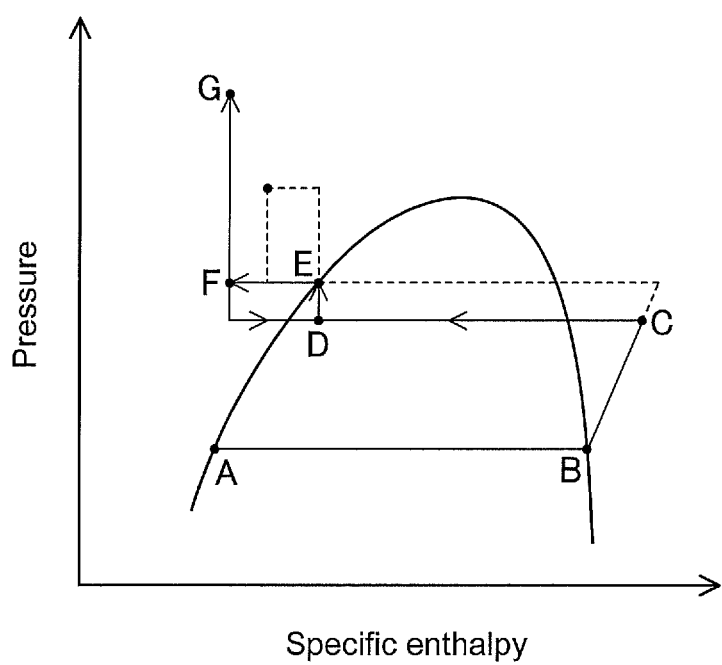
FIG. 7 is a Mollier diagram for the heat pump apparatus of the modification 3.
Figure 8:
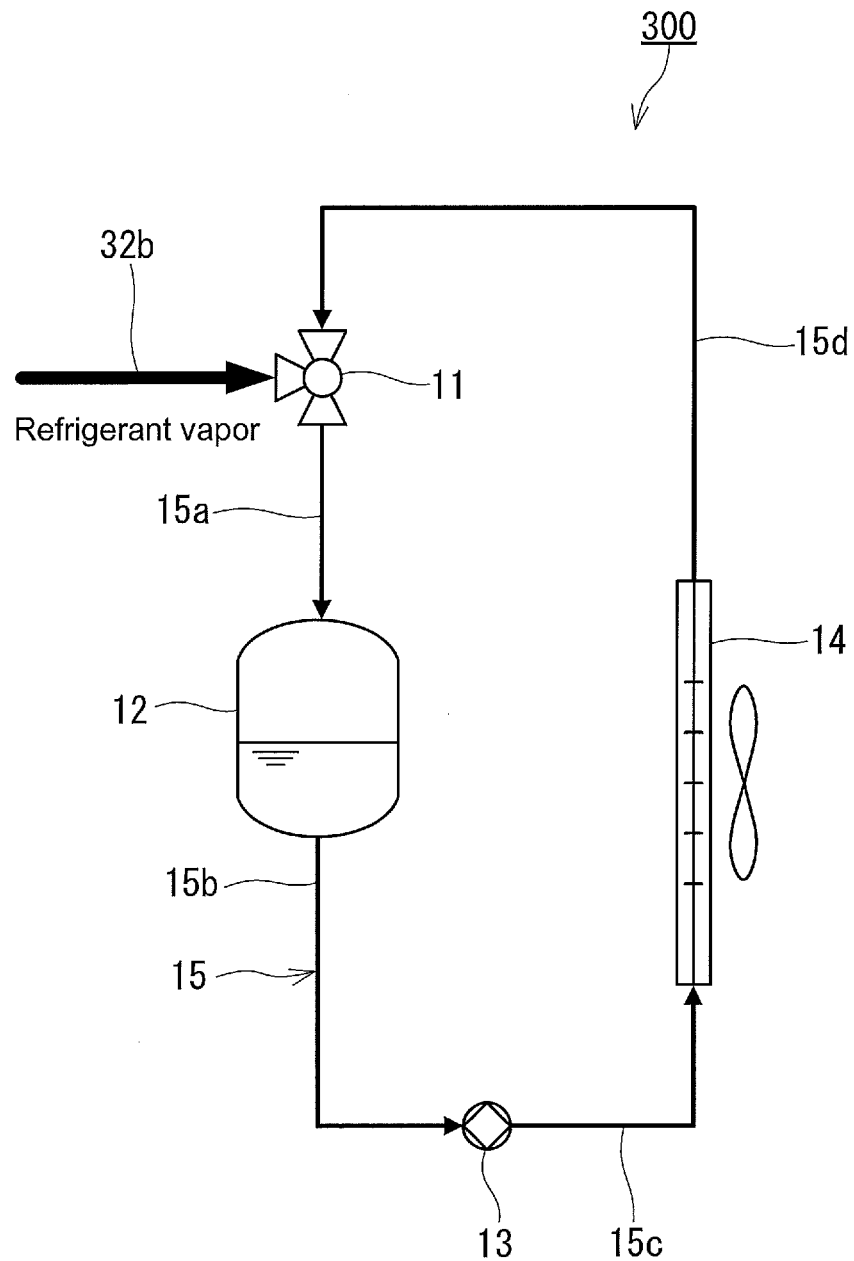
FIG. 8 is a configuration diagram of a heat exchange apparatus according to a modification 4.
Figure 9:
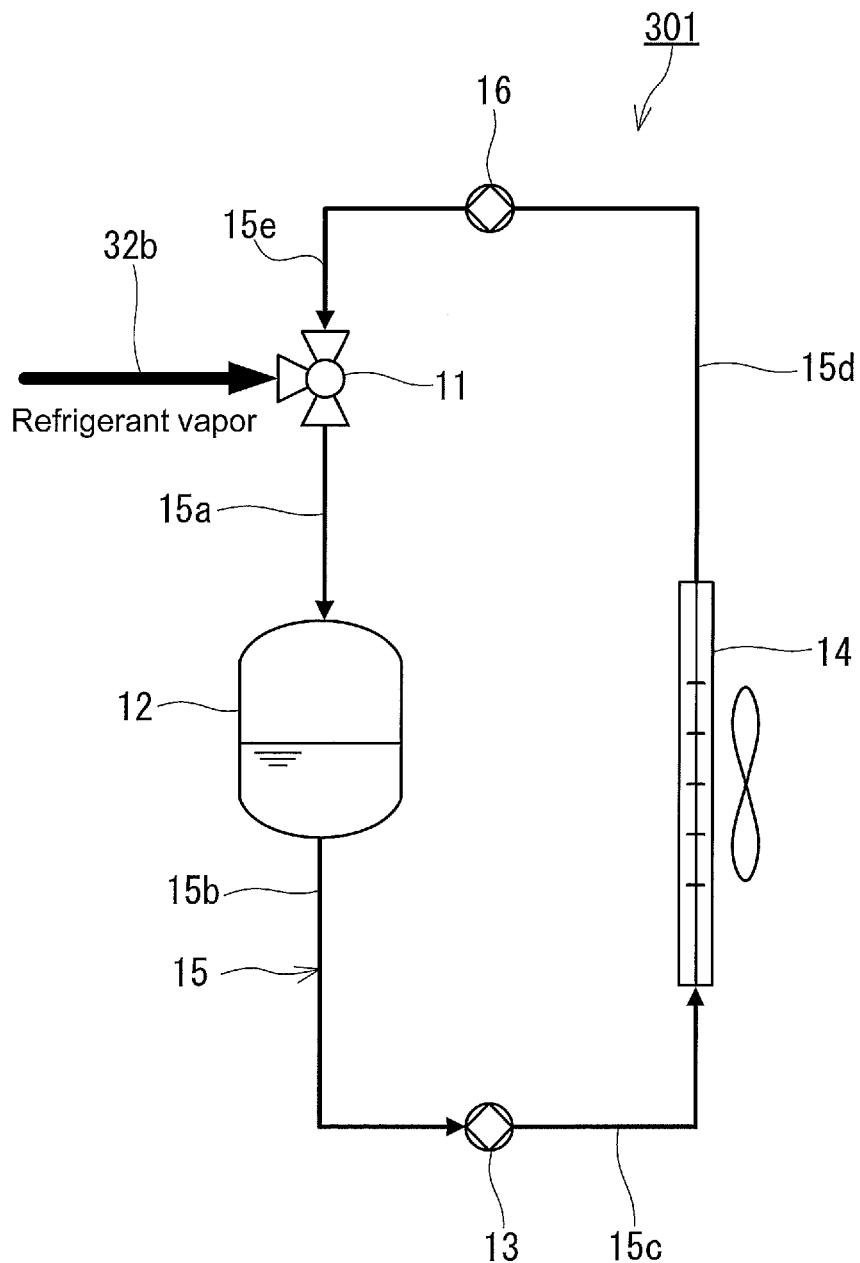
FIG. 9 is a configuration diagram of a heat exchange apparatus according to a modification 5.
Figure 10:
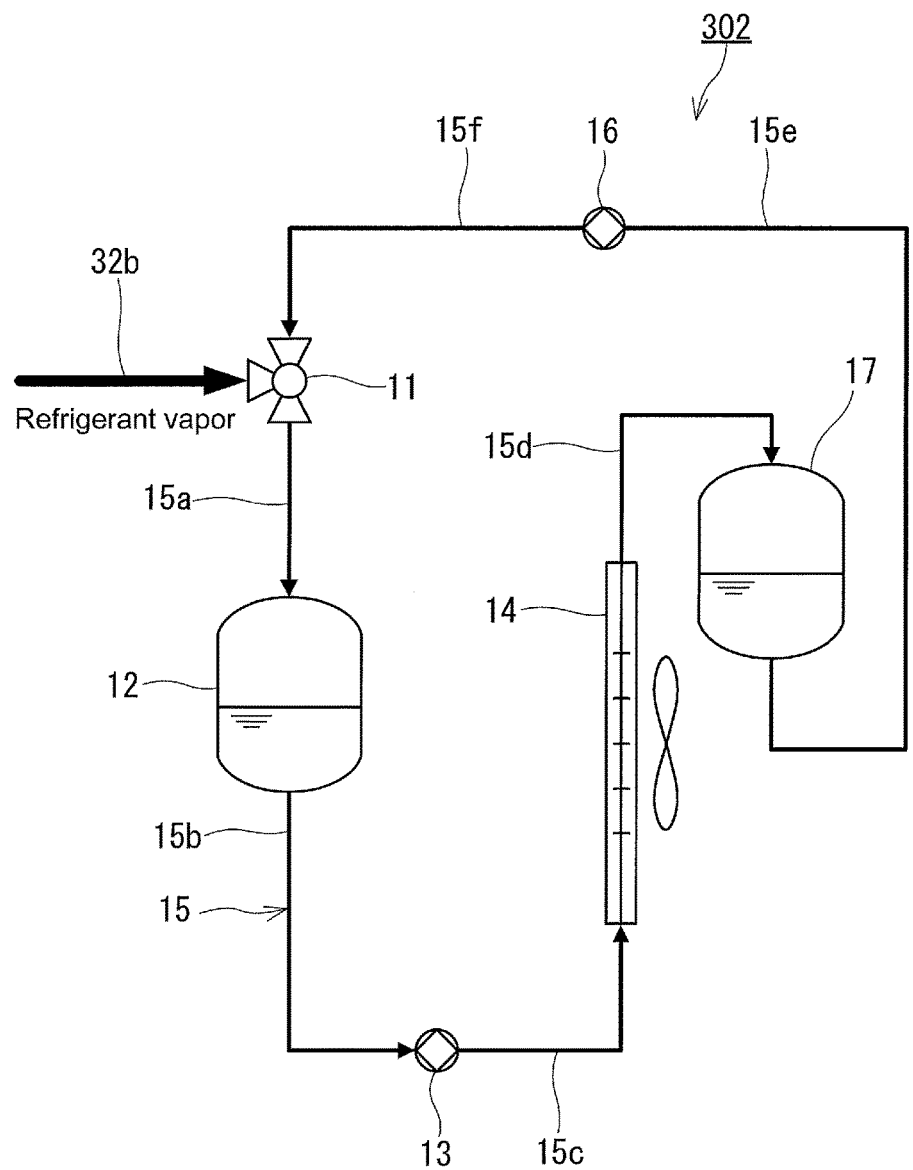
FIG. 10 is a configuration diagram of a heat exchange apparatus according to a modification 6.
Figure 11:
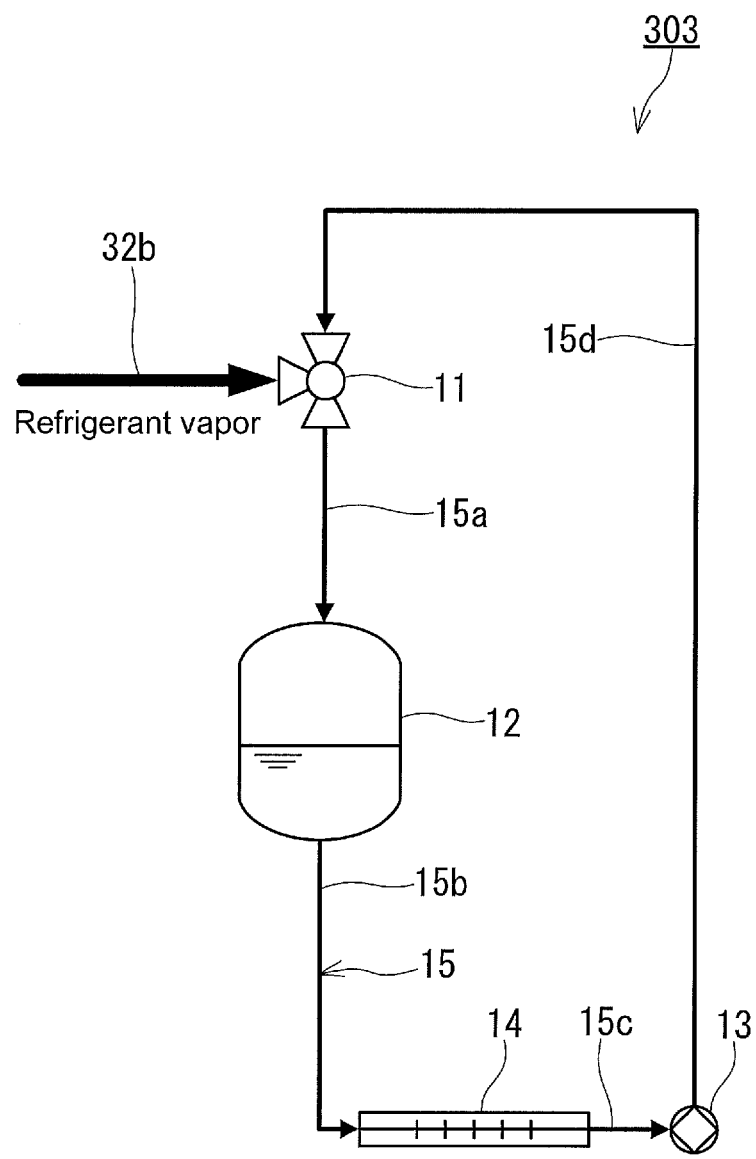
FIG. 11 is a configuration diagram of a heat exchange apparatus according to a modification 7.

FIG. 7 is a Mollier diagram for the heat pump apparatus 203 of the present modification. The processes from the point A to the point E are as described with reference to FIG. 3B. The refrigerant liquid retained in the first extractor 12 is delivered to the first heat exchanger 14, and is cooled to a temperature in the subcooled region in the first heat exchanger 14 (point E→point F). The cooled refrigerant liquid is caused to increase in pressure by the first pump 13 (point F→point G). The refrigerant liquid having an increased pressure is fed to the ejector 11 as a driving flow (point G→point D).

According to the present modification, the merged refrigerant flow produced in the ejector 11 is delivered to the first extractor 12, the refrigerant liquid is extracted from the merged refrigerant flow in the first extractor 12, and the refrigerant liquid is delivered to the first heat exchanger 14. The first pump 13 is provided between the outlet of the first heat exchanger 14 and the inlet of the ejector 11 in the liquid path 15. The refrigerant liquid extracted in the first extractor 12 is cooled in the first heat exchanger 14, and drawn into the first pump 13. With such a configuration, the inside of the liquid path 15 leading from the first extractor 12 to the ejector 11 via the first heat exchanger 14 can be filled with the refrigerant liquid, and the refrigerant liquid can be continuously pumped by the first pump 13 to the ejector 11. In other words, entry of the refrigerant vapor into the liquid path 15 can be prevented.

The configuration of the present modification may be applied to the heat pump apparatus 202 of the modification 2. That is, in the heat pump apparatus 202 of the modification 2, the first heat exchanger 14 may be located between the first extractor 12 and the first pump 13.

(Modifications 4 to 7)

As shown in FIG. 8, FIG. 9, FIG. 10, and FIG. 11, heat exchange apparatuses 300, 301, 302, and 303 respectively correspond to the first heat exchange units 10, 10B, 10C, and 10D of the heat pump apparatuses 200, 201, 202, and 203 described with reference to FIG. 1, FIG. 4, FIG. 5, and FIG. 6. That is, when the compressor 31 and the second heat exchange unit 20 are omitted from the heat pump apparatuses 200, 201, 202, and 203, the first heat exchange units 10, 10B, 10C, and 10D can function as the heat exchange apparatuses 300, 301, 302, and 303, respectively. A specific exemplary case is a situation where the refrigerant vapor is supplied to the ejector 11 from a vapor supply source substituting for the compressor 31 and the evaporator 21. Since the temperature of the refrigerant is increased in the ejector 11, excellent heating effect can be exerted in the first heat exchanger 14. The vapor supply source is not particularly limited. For example, the refrigerant vapor can be produced by a boiler. Alternatively, the refrigerant vapor can be produced by a heat exchanger with the use of solar heat or exhaust heat from a factory.

INDUSTRIAL APPLICABILITY

The heat exchange apparatuses and the heat pump apparatuses disclosed in the present description are useful particularly for air conditioners such as household air conditioners and industrial air conditioners.

The invention claimed is:

1. A heat pump apparatus comprising:
   a compressor that compresses a refrigerant vapor;
   a first heat exchanger through which a refrigerant liquid flows;
   an ejector that produces a merged refrigerant flow using the refrigerant vapor compressed by the compressor and the refrigerant liquid flowing from the first heat exchanger;
   a first extractor that receives the merged refrigerant flow from the ejector and extracts the refrigerant liquid from the merged refrigerant flow;
   a liquid path leading from the first extractor to the ejector via the first heat exchanger;
   a first pump that is provided in the liquid path and pumps the refrigerant liquid from the first extractor to the ejector;
   an evaporator that retains the refrigerant liquid and evaporates the refrigerant liquid so as to produce the refrigerant vapor to be compressed by the compressor;
   a second heat exchanger through which the refrigerant liquid retained in the evaporator or a heat medium for heating the refrigerant liquid retained in the evaporator flows;
   a circulation path in which the refrigerant liquid or the heat medium circulates via the second heat exchanger; and
   another pump that is provided in the circulation path and pumps the refrigerant liquid or the heat medium from the evaporator to the second heat exchanger.

2. The heat pump apparatus according to claim 1, wherein the first pump is provided between the first extractor and the first heat exchanger in the liquid path.

3. The heat pump apparatus according to claim 2, further comprising a second pump that is provided between the first heat exchanger and the ejector in the liquid path and that pumps, to the ejector, the refrigerant liquid flowing from the first heat exchanger.

4. The heat pump apparatus according to claim 3, wherein a pressure at an outlet of the first pump is lower than a pressure at an outlet of the second pump.

5. The heat pump apparatus according to claim 3, further comprising a second extractor that is provided between the first heat exchanger and the second pump in the liquid path and that extracts the refrigerant liquid from the refrigerant flowing from the first heat exchanger so that the refrigerant liquid is selectively fed to the second pump.

6. The heat pump apparatus according to claim 1, wherein the first pump is provided between the first heat exchanger and the ejector in the liquid path.

7. The heat pump apparatus according to claim 1, wherein the ejector comprises: a first nozzle to which the refrigerant liquid is fed; a second nozzle into which the refrigerant vapor is drawn; a mixing section that mixes the refrigerant liquid coming from the first nozzle and the refrigerant vapor coming from the second nozzle so as to produce the merged refrigerant flow; and a diffuser section that decelerates the merged refrigerant flow so as to restore a static pressure of the merged refrigerant flow.

8. The heat pump apparatus according to claim 1, wherein a pressure of the merged refrigerant flow discharged from the ejector is higher than a pressure of the refrigerant vapor drawn into the ejector, and is lower than a pressure of the refrigerant liquid fed to the ejector.

9. The heat pump apparatus according to claim 3, wherein a pump head of the second pump is set higher than a pump head of the first pump.

* * * * *